US006613723B2

(12) United States Patent
Buess et al.

(10) Patent No.: US 6,613,723 B2
(45) Date of Patent: Sep. 2, 2003

(54) OVERBASED BARIUM COMPLEXES OF $C_8$ TO $C_{10}$ CARBOXYLIC ACIDS

(75) Inventors: Philippe Buess, Overijse (BE); Cyriel Eddy Hendrickx, Zemst (BE); Bernard Francois Leroy, Céroux-Mousty (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/006,469

(22) Filed: Dec. 6, 2001

(65) Prior Publication Data

US 2003/0119683 A1 Jun. 26, 2003

(51) Int. Cl.[7] .......................... C10M 159/20; C08K 3/00
(52) U.S. Cl. ..................... 508/460; 524/385; 524/394; 524/400; 524/424; 106/218
(58) Field of Search .................. 508/460; 106/218; 524/400, 424

(56) References Cited

U.S. PATENT DOCUMENTS

| 2,510,035 | A |   | 5/1950  | Mack ........................ 524/396 |
|-----------|---|---|---------|--------------------------------------|
| 3,147,232 | A |   | 9/1964  | Norman et al. ............. 524/385   |
| 3,194,823 | A |   | 7/1965  | Le Suer et al. ............. 508/460  |
| 3,274,135 | A |   | 9/1966  | Norman et al. ............. 524/153   |
| 3,417,039 | A |   | 12/1968 | Penneck ...................... 524/82 |
| 4,123,399 | A |   | 10/1978 | Gay .......................... 524/101 |
| 4,251,451 | A |   | 2/1981  | Magee et al. ................ 554/157 |
| 4,665,117 | A |   | 5/1987  | Quinn ........................ 524/327 |
| 4,776,947 | A |   | 10/1988 | Streck et al. ............. 208/262.1  |
| 5,147,917 | A |   | 9/1992  | Sugawara et al. ........... 524/357   |
| 5,322,872 | A |   | 6/1994  | Quinn ........................ 524/186 |
|   H1536   | H | * | 6/1996  | Karn et al. ................. 508/460  |
| 5,663,388 | A |   | 9/1997  | Vargas et al. ............... 554/132  |
| 5,830,832 | A |   | 11/1998 | Benda et al. ................ 508/460  |
| 5,830,935 | A |   | 11/1998 | Khattar et al. .............. 524/114  |
| 5,859,267 | A |   | 1/1999  | Khattar et al. ................ 554/4  |
| 6,348,164 | B1| * | 2/2002  | Khattar et al. .............. 252/404  |

FOREIGN PATENT DOCUMENTS

| EP | 0 446 685 A1   | 9/1991  |         |
|----|----------------|---------|---------|
| WO | WO 92/06945    | 4/1992  |         |
| WO | WO02/094925 A2 | 11/2002 | C08K/5/00 |

* cited by examiner

Primary Examiner—Ellen M. McAvoy

(57) ABSTRACT

The present invention provides a process for preparing an overbased barium complex and an overbased barium complex prepared thereby. The process includes the steps of: heating a mixture of barium hydroxide monohydrate and an isomeric mixture of from about $C_{10}$ to about $C_{15}$ alcohols in the presence of a solvent, thereby producing a first mixture; contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex. The overbased barium complex of the present invention is useful in the stabilization of halogen-containing polymers.

36 Claims, No Drawings

OVERBASED BARIUM COMPLEXES OF $C_8$ TO $C_{10}$ CARBOXYLIC ACIDS

BACKGROUND OF THE INVENTION

1. Field of the Invention

The present invention relates to overbased barium complexes of an isomeric mixture of branched $C_8$ to $C_{10}$ carboxylic acids. More particularly, the present invention relates to overbased barium complexes of an isomeric mixture of branched $C_8$ carboxylic acids.

2. Description of the Prior Art

U.S. Pat. No. 2,510,035 (Mack) discloses a heat and light stabilized polyvinyl chloride resin containing a stabilizer. The stabilizer includes an alkali earth metal salt of a substituted chain aliphatic carboxylic acid containing from 4 to 16 carbon atoms. However, the stabilizer is a salt, not an overbased barium complex derived from an isomeric mixture of from about $C_8$ to about $C_{10}$ branched carboxylic acids and an isomeric mixture of from about $C_{10}$ to about $C_{15}$ alcohols.

U.S. Pat. No. 3,147,232 (Norman et al.) describes stabilizers for vinyl chlorides polymers. The stabilizers include a mixture of alcohols, aliphatic monocarboxylic acid having from 12 to 20 carbon atoms and alkaline earth metal compounds such as barium oxide and barium hydroxide. The stabilizer is not derived from an isomeric mixture of from about $C_8$ to about $C_{10}$ branched carboxylic acids.

U.S. Pat. No. 3,194,823 (Le Suer et al.) discloses a process for preparing barium and cadmium containing organic complexes including mixing a monohydric alcohol, aliphatic acid and a metallic base. The aliphatic acid is oleic acid, not an isomeric mixture of from about $C_8$ to about $C_{10}$ branched carboxylic acids.

U.S. Pat. No. 3,274,135 (Norman et al.) discloses barium-cadmium organic complexes as stabilizers for halogen-containing resins. The complex is made by a process including preparing a mixture of an alcohol, such as aliphatic alcohol, an aliphatic monocarboxylic acid compound selected from the group consisting of aliphatic monocarboxylic acids and the barium and cadmium salts thereof, a barium base and a cadmium base. The complexes of the present invention do not have cadmium.

U.S. Pat. No. 3,417,039 (Penneck) teaches stabilizing compositions for chlorine containing polymer. The composition includes metal salts of organic acid containing from 4 to 18 carbon atoms, a polyhydric alcohol containing from 4 to 36 carbon atoms and an organic sulfur bearing compound. The metal can be barium. The complexes of the present invention do not have polyhydric alcohols nor do they have sulfur bearing compounds.

U.S. Pat. No. 4,123,399 (Gay) relates to a stabilizer from PVC including a mixed salt complex, polyol, a beta-diketone and a plasticizer. The complexes of the present invention do not have polyols or a beta-diketones.

U.S. Pat. No. 4,251,451 (Magee et al.) describes a process for producing a mixture of branched and linear carboxylic acid salts. The process includes reacting a mixture of branched and linear alcohols with a caustic of the formula $M(OH)_n$ to produce a reaction mixture containing carboxylic acid salts of the formula $(RCOO)_nM$. M can be barium. R is selected from linear alkyl and branched alkyl groups having up to 19 carbon atoms. This process is a process for producing a mixture of branched and linear carboxylic acid salts, not a process for producing an overbased barium complex derived from an isomeric mixture of from about $C_8$ to about $C_{10}$ branched carboxylic acids and an isomeric mixture of from about $C_{10}$ to about $C_{15}$ alcohols.

U.S. Pat. No. 4,776,947 (Streck et al.) mentions isotridecanol as placticizer for PVC. The isotridecanol is not part of an overbased barium complex.

U.S. Pat. No. 5,147,917 (Sugarwara et al.) discloses a halogenated resin composition including an overbased alkaline earth metal carboxylate/carbonate complex together with a beta-diketone compound or a metal salt thereof. The overbased alkaline earth metal carboxylate/carbonate can be represented by the following formula: $R_2M_xCO_3$ wherein R includes residue of 2-ethylhexylic acid and M is Ba. The complex is not an overbased barium complex having isotridecanol.

U.S. Pat. No. 5,322,872 (Quinn) relates to compositions of mixed carboxylates used as stabilizers for polymers. The compositions contain barium salt of a carboxylic acid having at least 6 atoms and an oxime complexing agent. The complexes of the present invention do not have an oxime complexing agent.

U.S. Pat. No. 5,830,832 (Benda et al.) describes high basicity calcium carboxylates obtained by carbonating a mixture of branched chain oxo-acids, such as, Cekanoic® acids, and excess calcium in the presence of a volatile solvent. The carboxylates can be used in paints, as lubricants and fuel additives. The overbased barium complexes of the present invention do not have calcium.

U.S. Pat. No. 5,830,935 (Khattar et al.) describes a process for producing light colored basic alkali and alkaline earth metal salts by reacting a basic alkali earth metal compound, an alkyl phenol and/or a carboxylic acid and carbon dioxide to form a reaction product and thereafter post treating the reaction product with a liquid glycidyl ester having a $C_7$–$C_7$ alkyl group to improve color. The compositions described in this patent are light colored basic alkali and alkaline earth metal salts, not complexes, and are derived from oleic acid and phenols, such as, nonyl- and dodecyl phenol.

U.S. Pat. No. 5,859,267 (Khattar et al.) describes the preparation and use of a 34% Ba complex. The barium is stabilized into a liquid by reacting barium hydroxide with a carboxylic acid, such as, oleic acid, and by reacting the resulting mixture with $CO_2$ in the presence of linear alcohols and nonylphenol. The compositions described in this patent are also derived from oleic acid and nonylphenol. The number of equivalents of carboxylic acid is significantly lower than the number of equivalents of barium, and the unneutralized barium is present as a carbonate formed in situ and stabilized by nonylphenol and alcohol. Nonylphenol is an environmentally toxic material and such products are usually viscous and highly colored and, as a result, when used as additives to polyvinyl chloride polymers, they can impart unwanted color to the polymers, and as such, should be avoided.

None of the above references describe overbased low color products that are suitable for use in stabilizing polyvinyl chloride without the need for a decolorization step.

Accordingly, the present invention provides a highly overbased barium complex of a branched $C_8$ to $C_{10}$ carboxylic acid that has low color and which can be used to stabilize polyvinyl chloride polymers without the need for a decolorization step.

SUMMARY OF THE INVENTION

The present invention provides a process for preparing an overbased barium complex. The process includes the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of $C_8$ to about $C_{10}$ branched carboxylic acids is substantially free of 2-ethylhexanoic acid.

The isomeric mixture of $C_8$ to $C_{10}$ branched carboxylic acids is preferably an isomeric mixture of $C_8$ branched carboxylic acids (e.g., Cekanoic® 8 acid, available from ExxonMobil Chemical Company).

The present invention also provides an overbased barium complex prepared by a process which includes the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of $C_8$ to about $C_{10}$ branched carboxylic acids is substantially free of 2-ethylhexanoic acid.

The present invention further provides a stabilized halogen-containing polymer composition which includes:

(a) a halogen-containing polymer; and (b) a heat stabilizing amount of an overbased barium complex prepared by a process which includes the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of $C_8$ to about $C_{10}$ branched carboxylic acids is substantially free of 2-ethylhexanoic acid.

The present invention still further provides an air-drying coating composition including:

(a) an alkyd resin; and (b) an overbased barium complex in an amount effective for air-drying, wherein the overbased barium complex is prepared by a process including the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of from about $C_5$ to about $C_{10}$ branched carboxylic acids is substantially free of 2-ethylhexanoic acid.

The present invention also provides an engine oil composition having detergent properties including:

(a) an engine oil; and (b) an overbased barium complex in an amount effective for producing detergent properties, wherein the overbased barium complex is prepared by a process including the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of $C_8$ to about $C_{10}$ branched carboxylic acids is substantially free of 2-ethylhexanoic acid.

The present invention provides a process for preparing an overbased barium complex using an isomeric mixture of $C_4$ to $C_{13}$ branched carboxylic acids. The process includes the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of $C_4$ to $C_{13}$ branched carboxylic acids prepared by the oxo process, thereby producing a second mixture which includes unreacted barium hydroxide; and contacting the second mixture and carbon dioxide, thereby producing the overbased barium complex;

with the proviso that when the barium concentration in the overbased barium complex is 25 wt. % or more, the isomeric mixture of $C_4$ to about $C_{13}$ branched carboxylic acids is substantially free of 2-ethylhexanoic acid.

In addition to providing clear solutions, low color and excellent stability, the present invention provides other advantages that will be apparent from the detailed description that follows.

DETAILED DESCRIPTION OF THE INVENTION

The overbased barium complexes of the present invention are prepared by carbonation with carbon dioxide of an excess amount of barium hydroxide dispersed in a reaction medium containing the branched $C_8$ carboxylic acid, a solvent and an alcohol, followed by filtration of the reaction mixture to produce a solution of the overbased barium complex product. Carbonation can be carried out in the presence of catalysts, such as, metal oxides and zinc carboxylates, and promoters, such as, higher alcohols, glycols and amines.

The basicity for mono carboxylic acids is defined as follows:

$$\text{Basicity} = \frac{\text{moles of metal} \times \text{valency of metal}}{\text{moles of carboxylic acid}}$$

The basicity represents the excess of metal incorporated in the salt over stoichiometry of a neutral salt. A neutral salt has a basicity of 1.

The barium complexes described in the present invention are highly overbased. For example, in the fourth entry of Table 1 below, 1.59 moles of barium (300 g of barium hydroxide monohydrate of molecular weight 189) and 0.23 moles of Cekanoic® 8 acid (33 g, molecular weight 144) are used. Accordingly, the basicity is: $(1.59 \times 2)/0.23 = 13.8$. Preferably, the basicity is in the range of from about 10 to about 15. The excess over neutrality (most of the barium in this case) is present as a carbonate stabilized as a micellar structure which is formed in situ by reaction with the $CO_2$.

Instead of the environmentally toxic nonylphenol and the linear alcohols used in the prior art, the overbased barium complexes of the present invention are prepared using aliphatic alcohols in the range, such as, Exxal® 13 alcohol, a tridecanol available from ExxonMobil Chemical Company, or Acropol 35, about at least 60 wt. % linear alcohols, containing $C_{13}$ and $C_{15}$ alcohols, available from ExxonMobile Chemical Company, with a $C_{13}$: $C_{15}$ ratio of 33:67.

This replacement reduces the environmental toxicity of the product and improves the color and viscosity of the product, thereby making it suitable for use, for example, as a stabilizer for polyvinyl chloride (PVC) polymers.

Generally, the overbased barium complexes of the present invention can be prepared using branched oxo acid prepared by the so called oxo process. The term oxo acid in the context of the present invention refers to aliphatic monocarboxylic acids prepared by the oxo process. It does not refer to carbonyl group-containing acids, such as, alpha-, beta- or gamma-ketoacids, which are sometimes also called oxo-acids.

The oxo acid suitable for use in the present invention is prepared by the oxo process and is preferably a monocarboxylic acid which has a carbon number in the range of from about $C_5$ to about $C_{10}$, preferably from about $C_7$ to about $C_{10}$, and more preferably from about $C_8$ to about $C_{10}$, wherein acids having methyl branches are preferred. An example of the preferred $C_8$ to $C_{10}$ branched carboxylic acids is Cekanoic® 8 acid which is produced by ExxonMobil Chemical Company. Cekanoic® 8 acid typically includes a mixture of isomeric $C_8$ branched carboxylic acids. The use of such acids in the present invention is in sharp contrast to the use of oleic acid, which is most commonly used in the examples of the prior art.

The branched oxo acid is preferably a mono-carboxylic oxo acid which has a carbon number in the range of from about $C_4$ to $C_{13}$, preferably from about $C_5$ to $C_{12}$, more preferably from about $C_5$ to $C_{10}$, preferably from $C_5$ to $C_{10}$, and most preferably from about $C_8$ to $C_{10}$, wherein methyl branches are preferred. The preferred branched oxo acids are those wherein the branched acids contain a quaternary carbon. The mono-carboxylic oxo acid is at least one acid selected from the group consisting of: iso-pentanoic acids, iso-hexanoic acids, iso-heptanoic acids, iso-octanoic acids, iso-nonanoic acids, and iso-decanoic acids. The most preferred branched acid is iso-octanoic acid, e.g., Cekanoic® 8 acid.

The term "alpha-carbon" as referred to herein shall mean the carbon atom along the carbon chain, which is nearest the carbonyl carbon. The beta-carbon is the carbon next to the alpha-carbon and higher carbons are those attached to the beta-carbon and beyond.

Another preferred branched acid is Cekanoic 9 acid, an iso-nonanoic acid, such as, 3,5,5-trimethyl hexanoic acid, also available from ExxonMobil Chemical Company.

The branched oxo acid can include a single isomer or multiple isomers, such as, 2 or more isomers.

Branched oxo acids may be produced in the so-called oxo process by hydroformylation of branched $C_4$ to $C_9$ olefin fractions to a corresponding branched $C_4$ to $C_{13}$, typically $C_5$ to $C_{10}$, aldehyde-containing oxonation product. In the process for forming oxo acids it is desirable to form an aldehyde intermediate from the oxonation product followed by conversion of the crude oxo aldehyde product to an oxo acid.

In order to commercially produce oxo acids, the hydroformylation process is adjusted to maximize oxo aldehyde formation. This can be accomplished by controlling the temperature, pressure, catalyst concentration, and/or reaction time. Thereafter, the demetalled crude aldehyde product is distilled to isolate the aldehyde which is then oxidized according to the reaction below to produce the desired oxo acid:

$$RCHO + 1/2\ O_2 \rightarrow RCOOH \qquad (1)$$

wherein R is a branched alkyl group.

Alternatively, oxo acids can be formed by reacting the demetalled crude aldehyde product with water in the presence of an acid-forming catalyst and in the absence of hydrogen, at a temperature in the range of from about 93° C. to about 205° C. and a pressure of between about 0.1 to 6.99 MPa, thereby converting the concentrated aldehyde-rich product to a crude acid product and separating the crude acid product into an acid-rich product and an acid-poor product.

The production of branched oxo acids from the cobalt catalyzed hydroformylation of an olefinic feedstream preferably includes the following steps:

(a) hydroformylating an olefinic feedstream by reaction with carbon monoxide and hydrogen (i.e., synthesis gas) in the presence of a hydroformylation catalyst under reaction conditions that promote the formation of an aldehyde-rich crude reaction product;

(b) demetalling the aldehyde-rich crude reaction product to recover therefrom the hydroformylation catalyst and a substantially catalyst-free, aldehyde-rich crude reaction product;

(c) separating the catalyst-free, aldehyde-rich crude reaction product into a concentrated aldehyde-rich product and an aldehyde-poor product;

(d) reacting the concentrated aldehyde-rich product either with (i) oxygen (optionally with a catalyst) or (ii) water in the presence of an acid-forming catalyst and in the absence of hydrogen, thereby converting the concentrated aldehyde-rich product into a crude acid product; and (e) separating the crude acid product into a branched oxo acid and an acid-poor product.

The olefinic feedstream is preferably any $C_4$ to $C_9$ olefin, more preferably a branched $C_7$ olefin. Moreover, the olefinic feedstream is preferably a branched olefin, although a linear olefin which is capable of producing all branched oxo acids are also contemplated herein.

The hydroformylation and subsequent reaction of the crude hydroformylation product with either (i) oxygen (e.g., air), or (ii) water in the presence of an acid-forming catalyst, is capable of producing, for example, branched $C_5$ to $C_{10}$ acids, more preferably branched $C_8$ acid (i.e., Cekanoic® 8 acid).

Each of the branched oxo from about $C_5$ to $C_{10}$ acids formed by the conversion of branched oxo aldehydes typically includes, for example, a mixture of branched oxo acid isomers, e.g., Cekanoic®8 acid includes a mixture of 3,5-dimethyl hexanoic acid, 4,5-dimethyl hexanoic acid, 3,4-dimethyl hexanoic acid, 5-methyl heptanoic acid, 4-methyl heptanoic acid, mixed methyl heptanoic acids and dimethyl hexanoic acids.

Any type of catalyst known to one of ordinary skill in the art which is capable of converting oxo aldehydes to oxo acids is contemplated by the present invention. Preferred acid-forming catalysts are disclosed in the commonly assigned U.S. Pat. No. 5,663,388 (Vargas et al.) which is incorporated herein by reference.

It is preferable if the acid-forming catalyst is a supported metallic or bimetallic catalyst. One such catalyst is a bimetallic nickel-molybdenum catalyst supported on alumina or silica alumina which catalyst has a phosphorous content of about 0.1 wt. % to 1.0 wt. %, based on the total weight of the catalyst. Another catalyst can be prepared by using phosphoric acid as the solvent for the molybdenum salts which are impregnated onto the alumina support. Still other bimetallic, phosphorous-free Ni/Mo catalyst may be used to convert oxo aldehydes to oxo acids.

A particularly preferred acid is an isomeric mixture of saturated organic carboxylic acids containing from $C_8$ to $C_{10}$ carbon atoms, in which the content of linear acids is preferably 10 wt. % or less, the balance being branched acids. The most preferred branched acid is iso-octanoic acid, e.g., Cekanoic® 8 acid. An example of such commercially available carboxylic acid mixtures is Cekanoic® 8 acid, (Isooctanoic Acid) available from ExxonMobil Chemical Company.

As mentioned above, Cekanoic® 8 acid includes a mixture of isomers of octanoic acid. Among the acids in Cekanoic® 8 acid are: 3,5-dimethylhexanonic acid; 4,5-dimethylhexanoic acid; 1,4-methylheptanoic acid; 3,4-dimethylhexanoic acid; 3-ethylhexanoic acid; 6-methylheptanoic acid; and 5-methylheptanoic acid.

Preferably, the isomeric mixture of branched $C_8$ to $C_{10}$ carboxylic acids is an isomeric mixture of branched $C_8$ carboxylic acids, i.e., Cekanoic® 8 acid. Typically, Cekanoic® 8 acid includes at most 10% by weight of n-octanoic acid, at most 10% by weight of $C_8$ acids that are branched on carbon 2 and at least 80% by weight of $C_8$ acids, which are, branched on carbon 3 and/or carbons of higher rank. Accordingly, the isomeric mixture of oxo $C_8$ branched carboxylic acid preferably includes about 10% by weight of n-octanoic acid, about 10% by weight of $C_8$ acids that are branched on carbon 2 and about 80% by weight of $C_8$ acids which are branched on carbon 3 and/or carbons of higher rank.

Another example of a commercial mixture available from ExxonMobil Chemical Company is Cekanoic 9 acid, which is reported to include at least 96 wt. % of 3,5,5-trimethylhexanoic acid.

An isomeric mixture of about $C_8$ to about $C_{10}$ branched oxo acids can include 2-ethylhexanoic acid (2-EH) if the barium concentration in the overbased barium complex is less than 25 wt. %. However, if the barium concentration in the overbased barium complex is 25 wt. % or more, the isomeric mixture of about $C_8$ to about $C_{10}$ branched carboxylic acids is substantially free of 2-ethylhexanoic acid.

The molar ratio of total barium hydroxide to the isomeric mixture of branched $C_8$ to $C_{10}$ carboxylic acid employed in the reaction is generally from about 0.5:1 to 8:1, preferably from about 5:1 to 8:1.

The isomeric mixture of $C_{10}$ to $C_{15}$ alcohols can be an isomeric mixture of $C_{11}$ to $C_{14}$ alcohols, an isomeric mixture of $C_{13}$ and $C_{15}$ alcohols or a mixture thereof. The isomeric mixture of $C_{11}$ to $C_{14}$ alcohols includes from about 0 wt. % to about 10 wt. % $C_{11}$, from about 5 wt. % to about 35 wt. % $C_{12}$, from about 55 wt. % to about 85 wt. % $C_{13}$ and from about 0 wt. % to about 5 wt. % $C_{14}$, and preferably from about 7% $C_{11}$, about 30% $C_{12}$, about 60% $C_{13}$ and about 3% $C_{14}$.

The isomeric mixture of $C_{11}$ to $C_{14}$ alcohols typically has an average number of branches per molecule of from about 1.5 to about 3 and an average carbon number of about 12.5 to about 13.0.

The preferred alcohols include Exxal® 13 alcohol, and Acropol 35, both products of ExxonMobil Chemical Company.

The present inventors have succeeded in preparing barium complexes that are free of nonylphenol, have, for example, about 34% barium, very light color, low viscosity and good stability. The overbased barium complexes of the present invention, which preferably are in liquid form and contain from about 25 wt. % to about 40 wt. % barium, more preferably from about 30 wt. % to about 34 wt. % barium, can be used in the stabilization of PVC, usually in conjunction with zinc compounds, as well as in other applications, such as, paint dryers and lube additives.

In a preferred embodiment of the process of the present invention barium hydroxide, preferably in the hydrated form, is reacted with a branched $C_8$ carboxylic acid and thereafter passing carbon dioxide through the reaction mixture. The process is characterized in that the reaction is performed in at least one organic solvent, preferably at a temperature from about 50° C. to about 175° C., more preferably from about 75° C. to about 160° C., and most preferably from about 140° C. to about 160° C.

At the beginning of the reaction, the reactants and a diluent are added to a reactor. Thus, a mixture of barium hydroxide monohydrate and an isomeric mixture of $C_{10}$ to $C_{15}$ alcohols in the presence of a solvent is heated at a temperature and length of time sufficient to produce a first mixture. Typically, heating of the first mixture is carried out at about 100° C. to remove substantially all of the water of hydration from the barium hydroxide monohydrate. Thereafter, the first mixture and a branched carboxylic acid, such as, an isomeric mixture of branched $C_8$ to $C_{10}$ carboxylic acids, are contacted at a temperature and length of time sufficient to produce a second mixture including unreacted barium hydroxide, the unreacted barium hydroxide resulting from the use of an excess barium hydroxide monohydrate relative to the isomeric mixture of branched $C_8$ to $C_{10}$ carboxylic acids.

A portion of the organic solvent, as well as any water present in the barium hydroxide source, such as barium hydroxide monohydrate, or any water formed in the reaction, are removed in this step by distillation. Thereafter, the second mixture and carbon dioxide are contacted. The amount of the carbon dioxide must be sufficient to produce an overbased barium complex according to the present invention. The period of carbonation is preferably from about 0.5 hours to about 4 hours, more preferably from about 1 to about 2 hours.

Preferably, the overbased barium complex product is in the form of a solution and is usually filtered to remove any insoluble by-products. The diluent can be an oil, an organic solvent, such as an aromatic or aliphatic solvent, including hydrocarbon solvents. An example of such a solvent is Exxsol D60 which is a dearomatized hydrocarbon product of ExxonMobil Chemical Company.

The solvent can be a volatile solvent and can contain one or more additional non-polar organic solvents, such as, naphtha, hexane, kerosene, benzene, toluene or xylene. It is also possible to use a mixture of paraffinic hydrocarbons of mineral or synthetic origin, preferably containing a low proportion of aromatic and/or naphthenic hydrocarbons, such as white spirit.

Additional polar organic co-solvents, such as, $C_1$ to $C_6$ alcohols, can also be used. Such polar solvents include, for example, methanol, 1-butanol, 2-butanol, ethylene glycol, propylene glycol, ethylene glycol monomethyl ether, ethylene glycol dimethyl ether, diethylene glycol and its ethers, mixtures of alcohols derived from paraffin, methyl ethyl ketone, amines, for example aniline, phenylenediamine, or dodecylamine or a mixture of alcohols and/or amines, for example, of methanol and aqueous ammonia.

The overbased barium complexes prepared by the process of the present invention have utility as heat stabilizing additives, paint dryers, lubricant additives and metal working fluids.

In one embodiment, the present invention provides a stabilized halogen-containing polymer composition which includes:

(a) a halogen-containing polymer; and (b) a heat stabilizing amount of an overbased barium complex prepared by a process of the present invention.

Preferably, the halogen-containing polymer is polyvinyl chloride and the amount of the overbased barium complex is from about 0.01 wt. % to about 15 wt. % of the stabilized halogen-containing polymer composition.

In another embodiment, the present invention provides an air-drying coating composition, which includes:

(a) an alkyd resin; and (b) an overbased barium complex in an amount effective for air-drying, wherein the overbased barium complex is prepared by a process according to the present invention.

In still another embodiment, the present invention also provides an engine oil composition having detergent properties which includes:

(a) an engine oil; and (b) an overbased barium complex in an amount effective for producing detergent properties, wherein the overbased barium complex is prepared by a process according to the present invention.

Where it is desired to use the products as oil additives their oil solubility may be improved by the addition of up to 50 wt. %, preferably no more than 30 wt. % based on the weight of the branched $C_8$ carboxylic acid, of other suitable acids, such as, higher molecular weight organic acids to the reaction mixture or to the product. Such carboxylic acids that are derived from olefin polymers, and their derivatives, are well known in the art, and methods for their preparation as well as representative examples of the types useful in the present invention are described in detail in the literature.

When dissolved in an oil or a solvent, the overbased barium complexes according to the present invention can yield stable and completely clear solutions. Such clear solutions have a shelf life of up to a year. As a result, the overbased barium complexes according to the present invention find numerous applications, particularly as lubricant additives and in metal working fluids where they can impart detergent, extreme pressure, antiwear, anticorrosion and antirust properties. The metal working fluids may be straight oils, oil/water systems or totally aqueous.

In addition, due to their excellent stability and low color, i.e., a Pt/Co color value of less than about 10, the barium overbased salts can also be used as paint dryers, paint additives and as heat stabilizers, particularly as heat stabilizing additives for halogen-containing polymers, such as, polyvinyl chloride (PVC) polymers.

The present invention is illustrated by the following nonlimiting examples.

EXAMPLE 1

Preparation of Barium Complex Free of Nonylphenol

A glass laboratory reactor equipped with a Dean-Stark device for water removal was loaded with an alcohol, such as Exxal® 13 alcohol, which is isotridecanol available from ExxonMobil Chemical Company, and a solvent, such as, Exxsol D60, which is a dearomatized hydrocarbon solvent also available from ExxonMobil Chemical Company, and the resulting mixture was heated to 100° C. (type and amounts of the alcohol and solvent are as described in Table1). Thereafter, barium hydroxide monohydrate (300 g), represented by the formula $Ba(OH)_2.H_2O$, was added in three portions to the liquid. The temperature was raised to 155° C. under a flow of nitrogen. Water (about 25 g) was removed in the Dean Stark trap. Cekanoic® 8 acid (33 g), which is a mixture of isomeric $C_8$ branched carboxylic acids and is a product of ExxonMobil Chemical Company, was then added. Thereafter, $C_2$ was fed at a flow rate of 50 l/h to the reactor immediately after acid addition was completed. A short exotherm was observed. After a period of time (see Table 1), the $CO_2$ feed was stopped and the heating discontinued. Exxsol D60 (50 g) and water (45 g) were found in the Dean-Stark. The product was filtered at 120° C. A filter cake remained on the filter. The liquid obtained was analyzed for barium content and viscosity. The final product was very lightly colored and had a low viscosity. Final barium concentrations are shown in Table 1.

TABLE 1

| Alcohol type | Alcohol quantity | Acid type | Acid quantity | Ba(OH)2 · H2O | Exxsol D60 | Carbonation time | Aspect of end product | Barium (wt %) in end product | Viscosity @ 20° C. (cst) |
|---|---|---|---|---|---|---|---|---|---|
| Exxal 13 | 73.2 gr | Ck8 | 33 gr | 300 gr | 150 gr | 60' | Clear | 32.7 | N.M. |
| Exxal 13 | 73.2 gr | Ck8 | 33 gr | 300 gr | 150 gr | 40' | Clear | 32.4 | N.M. |
| Exxal 13 | 73.2 gr | Ck8 | 33 gr | 300 gr(1) | 150 gr | 50' | Clear | 36.1 | 42.1 |

TABLE 1-continued

| Alcohol type | Alcohol quantity | Acid type | Acid quantity | Ba(OH)2 · H2O | Exxsol D60 | Carbonation time | Aspect of end product | Barium (wt %) in end product | Viscosity @ 20° C. (cst) |
|---|---|---|---|---|---|---|---|---|---|
| Exxal 13 | 73.2 gr | Ck8 | 33 gr | 300 gr | 150 gr | 60' | Clear | 35.4 | 38.7 |
| Exxal 13 | 73.2 gr | Ck8 | 33 gr | 234.4 gr | 157 gr | 50' | Clear | 32.1 | 24.0 |
| Exxal 13 | 223.3 gr | Ck8 | 33 gr | 300 gr | None | 60' | 'White product | 33.5 | N.M. |
| Exxal 13 | 150 gr | Ck8 | 33 gr | 300 gr | 76.7 gr | 62' | 'white, unstable | 35.7 | N.M. |
| Exxal 13 | 32 gr | Ck8 | 33 gr | 300 gr | 191.2 gr | 60' | Clear | 4.8 | 4.2 |
| Acropol 35 | 73.25 gr | Ck8 | 33 gr | 300 gr | 150 gr | 60' | Clear | 35.5 | 69.3 |
| Exxal 8 | 47.6 gr | Ck8 | 33 gr | 300 gr | 175 gr | 60' | Clear | 8.2 | 3.4 |
| Exxal 13 | 73.2 gr | Ck9 | 36.1 gr | 300 gr | 147 gr | 60' | Clear | 33.7 | 42.0 |
| Nonanol | 51.2 gr | Ck9 | 36.1 gr | 300 gr | 169 gr | 60' | Not successful | Not successful | N.M. |
| Exxal 13 | 73.2 gr | Neo C10 | 39.2 gr | 300 gr | 138 gr | 60' | Not successful | Not successful | N.M. |
| Exxal 13 | 73.2 gr | 2EH | 33 gr | 300 gr | 150 gr | 34' | Yellow, unstable | 31.8 | N.M. |
| Exxal 13 | 73.2 gr | 2EH | 33 gr | 234.4 gr | 157 gr | 65' | Clear | 19.0 | N.M. |
| Exxal 13 | 73.2 gr | 2EH | 33 gr | 300 gr | 150 gr | 20' | Yellow, unstable | 28.2 | N.M. |
| Exxal 13 | 73.2 gr | 2EH | 33 gr | 300 gr | 150 gr | 60' | White product | Not successful | N.M. |

Note [1]Barium hydroxide was ground before reaction.
N.M.: not measured.
Not successful: filtration problems prevented obtaining a liquid product.
Ck8 referes to Cekanoic C8 acid available from ExxonMobil Chemical.
Ck9 referes to Cekanoic C9 acid available from ExxonMobil Chemical.
Neo C10 is neodecanoic acid, available from ExxonMobil Chemical.
Exxal 13 is isotridecanol, available from ExxonMobil Chemical.
Exxal 8 is iosoctanol, available from ExxonMobil Chemical.
Nonanol is a C9 alcohols containing at least 80% of 3;5,5 trimethyl hexanol and is available from ExxonMobil Chemical.
Acropol 35 is a semi-linear C13 and C15 alcohol, available from ExxonMobil Chemical.
Exxsol D60 is dearomatized hydrocarbon solvent, available from ExxonMobil Chemical.
2EH is 2-ethyl hexanoic acid.
Nonanol is a C9 alcohols containing at least 80% of 3,5,5 trimethyl hexanol, available from ExxonMobil Chemical.

EXAMPLE 2

PVC Stabilizer Formulation

Stabilizer "S":

| | |
|---|---|
| Barium complex (35% Ba) | 20% |
| Zinc octanoate (22% Zn) | 8% |
| Diphenylisodecylphosphite | 50% |
| Dibenzoylmethane | 2% |
| Solvent (i.e., a dearomatized hydrocarbon such as Exxsol D60) | 20% |
| Total | 100% |

Exxsol D60 is a dearomatized hydrocarbon solvent and is a product of ExxonMobil Chemical Company.

| PVC formulation: | |
|---|---|
| PVC resin (e.g. Solvic 264 GA) | 100 parts |
| Diisononylphthalate | 25 parts |
| Epoxidized soybean | 1.5 parts |
| Stabilizer "S" | 2.5 parts |

EXAMPLE 3

Paint Dryer (Siccatives) Formulation for Air-Drying Alkyd Paints

| Metal compound | % Metal per binder (solid matter) |
|---|---|
| Cobalt octanoate (10% Co) | 0.05 |
| Barium complex (35% Ba) | 0.40 |
| Calcium octanoate (10% Ca) | 0.25 |

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. A process for preparing an overbased barium complex comprising the steps of:

heating a mixture of barium hydroxide monohydrate and an isomeric mixture of from about $C_{10}$ to about $C_{15}$ alcohols in the presence of a solvent, thereby producing a first mixture;

contacting said first mixture and an isomeric mixture of from about $C_8$ to about $C_{10}$ branched carboxylic acids, thereby producing a second mixture which comprises unreacted barium hydroxide; and contacting said second mixture and carbon dioxide, thereby producing said overbased barium complex;

with the proviso that when the barium concentration in said overbased barium complex is 25 wt. % or more, said isomeric mixture of $C_8$ to about $C_{10}$ branched carboxylic acids is substantially free of 2-ethylhexanoic acid.

2. The process of claim 1, further comprising isolating said overbased barium complex in the form of a clear solution.

3. The process of claim 1, further comprising removing a portion of the volatiles from said clear solution.

4. The process of claim 1, wherein the molar ratio of said barium hydroxide monohydrate to said isomeric mixture of from about $C_8$ to about $C_{10}$ branched carboxylic acids is from about 0.5:1 to about 8:1.

5. The process of claim 1, wherein the molar ratio of said barium hydroxide monohydrate to said isomeric mixture of from about $C_8$ to about $C_{10}$ branched carboxylic acids is from about 5:1 to about 8:1.

6. The process of claim 1, wherein said isomeric mixture of $C_8$ to $C_{10}$ branched carboxylic acids is an isomeric mixture of $C_8$ branched carboxylic acids.

7. The process of claim 6, wherein said isomeric mixture of $C_8$ to $C_{10}$ branched carboxylic acids includes 3,5-dimethyl hexanoic acid, 4,5-dimethyl hexanoic acid, 3,4-dimethyl hexanoic acid, 5-methyl heptanoic acid, 4-methyl heptanoic acid, methyl heptanoic acids and dimethyl hexanoic acids.

8. The process of claim 1, wherein said isomeric mixture of $C_8$ to $C_{10}$ branched carboxylic acid includes at least 96 wt. % of 3,5,5-trimethylhexanoic acid.

9. The process of claim 1, wherein said isomeric mixture of $C_8$ to $C_{10}$ branched carboxylic acids is an isomeric mixture of oxo $C_8$ branched carboxylic acids.

10. The process of claim 9, wherein said isomeric mixture of oxo $C_8$ branched carboxylic acid includes about 10% by weight of n-octanoic acid, about 10% by weight of $C_8$ acids that are branched on carbon 2 and about 80% by weight of $C_8$ acids which are branched on carbon 3 and/or carbons of higher rank.

11. The process of claim 1, wherein said isomeric mixture of $C_{10}$ to $C_{15}$ alcohols is selected from the group consisting of: an isomeric mixture of $C_{11}$ to $C_{14}$ alcohols, an isomeric mixture of $C_{13}$ and $C_{15}$ alcohols and a mixture thereof.

12. The process of claim 11, wherein said isomeric mixture of $C_{11}$ to $C_{14}$ alcohols includes from about 0 wt. % to about 10 wt. % $C_{11}$, from about 5 wt. % to about 35 wt. % $C_{12}$, from about 55 wt. % to about 85 wt. % $C_{13}$ and from about 0 wt. % to about 5 wt $C_{14}$.

13. The process of claim 12, wherein said isomeric mixture of $C_{11}$ to $C_{14}$ alcohols includes $C_{11}$, $C_{12}$, $C_{13}$ and $C_{14}$ alcohols.

14. The process of claim 11, wherein said isomeric mixture of $C_{11}$ to $C_{14}$ alcohols has an average number of branches per molecule of from about 1.5 to about 3.

15. The process of claim 11, wherein said isomeric mixture of $C_{11}$ to $C_{14}$ alcohols has an average carbon number of from about 12.5 to about 13.0.

16. The process of claim 1, wherein said overbased barium complex has a Pt/Co color value of less than about 10.

17. An overbased barium complex prepared by a process comprising the steps of:
heating a mixture of barium hydroxide monohydrate and an isomeric mixture of from about $C_{10}$ to about $C_{15}$ alcohols in the presence of a solvent, thereby producing a first mixture;
contacting the first mixture and an isomeric mixture of from about $C_8$ to about $C_{10}$ branched carboxylic acids, thereby producing a second mixture which comprises unreacted barium hydroxide; and
contacting the second mixture and carbon dioxide, thereby producing said overbased barium complex;
with the proviso that when the barium concentration in said overbased barium complex is 25 wt. % or more, said isomeric mixture of $C_8$ to about $C_{10}$ branched carboxylic acids is substantially free of 2-ethylhexanoic acid.

18. A process for preparing an overbased barium complex comprising the steps of:
heating a mixture of barium hydroxide monohydrate and an isomeric mixture of from about $C_{11}$ to about $C_{14}$ alcohols in the presence of a solvent, thereby producing a first mixture;
contacting the first mixture and an isomeric mixture of from about $C_8$ branched carboxylic acids, thereby producing a second mixture which comprises unreacted barium hydroxide; and
contacting the second mixture and carbon dioxide, thereby producing said overbased barium complex;
with the proviso that when the barium concentration in said overbased barium complex is 25 wt. % or more, said isomeric mixture of $C_8$ to about $C_{10}$ branched carboxylic acids is substantially free of 2-ethylhexanoic acid.

19. The process of claim 18, further comprising isolating said overbased barium complex in the form of a clear solution.

20. The process of claim 18, further comprising removing a portion of the volatiles from said clear solution.

21. The process of claim 18, wherein the molar ratio of said barium hydroxide monohydrate to said isomeric mixture of from about $C_8$ to about $C_{10}$ branched carboxylic acids is from about 5:1 to about 8:1.

22. The process of claim 18, wherein said isomeric mixture of $C_8$ to $C_{10}$ branched carboxylic acids is an isomeric mixture of $C_8$ branched carboxylic acids.

23. The process of claim 18, wherein said isomeric mixture of oxo $C_8$ branched carboxylic acids includes n-octanoic acid, $C_8$ acids that are branched on carbon 2 and $C_8$ acids which are branched on carbon 3 and/or carbons of higher rank.

24. The process of claim 18, wherein said isomeric mixture of $C_{10}$ to $C_{15}$ alcohols is selected from the group consisting of: an isomeric mixture of $C_{11}$ to $C_{14}$ alcohols, an isomeric mixture of $C_{13}$ and $C_{15}$ alcohols and a mixture thereof.

25. The process of claim 24, wherein said isomeric mixture of $C_{11}$ to $C_{14}$ alcohols includes from about 0 wt. % to about 10 wt. % $C_{11}$, from about 5 wt. % to about 35 wt. % $C_{12}$, from about 55 wt. % to about 85 wt. % $C_{13}$ and from about 0 wt. % to about 5 wt $C_{14}$.

26. The process of claim 25, wherein said isomeric mixture of $C_{11}$ to $C_{14}$ alcohols includes $C_{11}$, $C_{12}$, $C_{13}$ and $C_{14}$ alcohols.

27. The process of claim 24, wherein said isomeric mixture of $C_{11}$ to $C_{14}$ alcohols has an average number of branches per molecule of from about 1.5 to about 3.

28. The process of claim 24, wherein said isomeric mixture of $C_{11}$ to $C_{14}$ alcohols has an average carbon number of from about 12.5 to about 13.0.

29. The process of claim 18, wherein said overbased barium complex has a Pt/Co color value of less than about 10.

30. An overbased barium complex prepared by a process comprising the steps of:
heating a mixture of barium hydroxide monohydrate and an isomeric mixture of from about $C_{11}$ to about $C_{14}$ alcohols in the presence of a solvent, thereby producing a first mixture;

contacting the first mixture and an isomeric mixture of from about $C_8$ branched carboxylic acids, thereby producing a second mixture which comprises unreacted barium hydroxide; and contacting the second mixture and carbon dioxide, thereby producing said overbased barium complex;

with the proviso that when the barium concentration in said overbased barium complex is 25 wt. % or more, said isomeric mixture of $C_8$ to about $C_{10}$ branched carboxylic acids is substantially free of 2-ethylhexanoic acid.

31. A stabilized halogen-containing polymer composition comprising:

(a) a halogen-containing polymer; and (b) a heat stabilizing amount of an overbased barium complex prepared by a process comprising the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which comprises unreacted barium hydroxide; and contacting the second mixture and carbon dioxide, thereby producing said overbased barium complex;

with the proviso that when the barium concentration in said overbased barium complex is 25 wt. % or more, said isomeric mixture of $C_8$ to about $C_{10}$ branched carboxylic acids is substantially free of 2-ethylhexanoic acid.

32. The stabilized composition of claim 31, wherein the amount of said overbased barium complex is from about 0.01 wt. % to about 15 wt. % of the stabilized composition.

33. The stabilized composition of claim 31, wherein halogen-containing polymer is polyvinyl chloride.

34. An air-drying coating composition comprising:

(a) an alkyd resin; and (b) an overbased barium complex in an amount effective for air-drying, wherein said overbased barium complex is prepared by a process comprising the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which comprises unreacted barium hydroxide; and contacting the second mixture and carbon dioxide, thereby producing said overbased barium complex;

with the proviso that when the barium concentration in said overbased barium complex is 25 wt. % or more, said isomeric mixture of $C_8$ to about $C_{10}$ branched carboxylic acids is substantially free of 2-ethylhexanoic acid.

35. An engine oil composition having detergent properties comprising:

(a) an engine oil; and (b) an overbased barium complex in an amount effective for producing detergent properties, wherein said overbased barium complex is prepared by a process comprising the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of from about $C_8$ to about $C_{10}$ branched carboxylic acids, thereby producing a second mixture which comprises unreacted barium hydroxide; and contacting the second mixture and carbon dioxide, thereby producing said overbased barium complex;

with the proviso that when the barium concentration in said overbased barium complex is 25 wt. % or more, said isomeric mixture of $C_8$ to about $C_{10}$ branched carboxylic acids is substantially free of 2-ethylhexanoic acid.

36. A process for preparing an overbased barium complex comprising the steps of:

heating a mixture of barium hydroxide monohydrate and an isomeric mixture of from about $C_{10}$ to about $C_{15}$ alcohols in the presence of a solvent, thereby producing a first mixture;

contacting the first mixture and an isomeric mixture of $C_4$ to $C_{13}$ branched carboxylic acids prepared by the oxo process, thereby producing a second mixture which comprises unreacted barium hydroxide; and contacting the second mixture and carbon dioxide, thereby producing said overbased barium complex;

with the proviso that when the barium concentration in said overbased barium complex is 25 wt. % or more, said isomeric mixture of $C_4$ to about $C_{13}$ branched carboxylic acids is substantially free of 2-ethylhexanoic acid.

* * * * *